April 18, 1939.   R. P. GLENN   2,154,842
HEADLIGHT SYSTEM AND MEANS
Filed Sept. 25, 1937
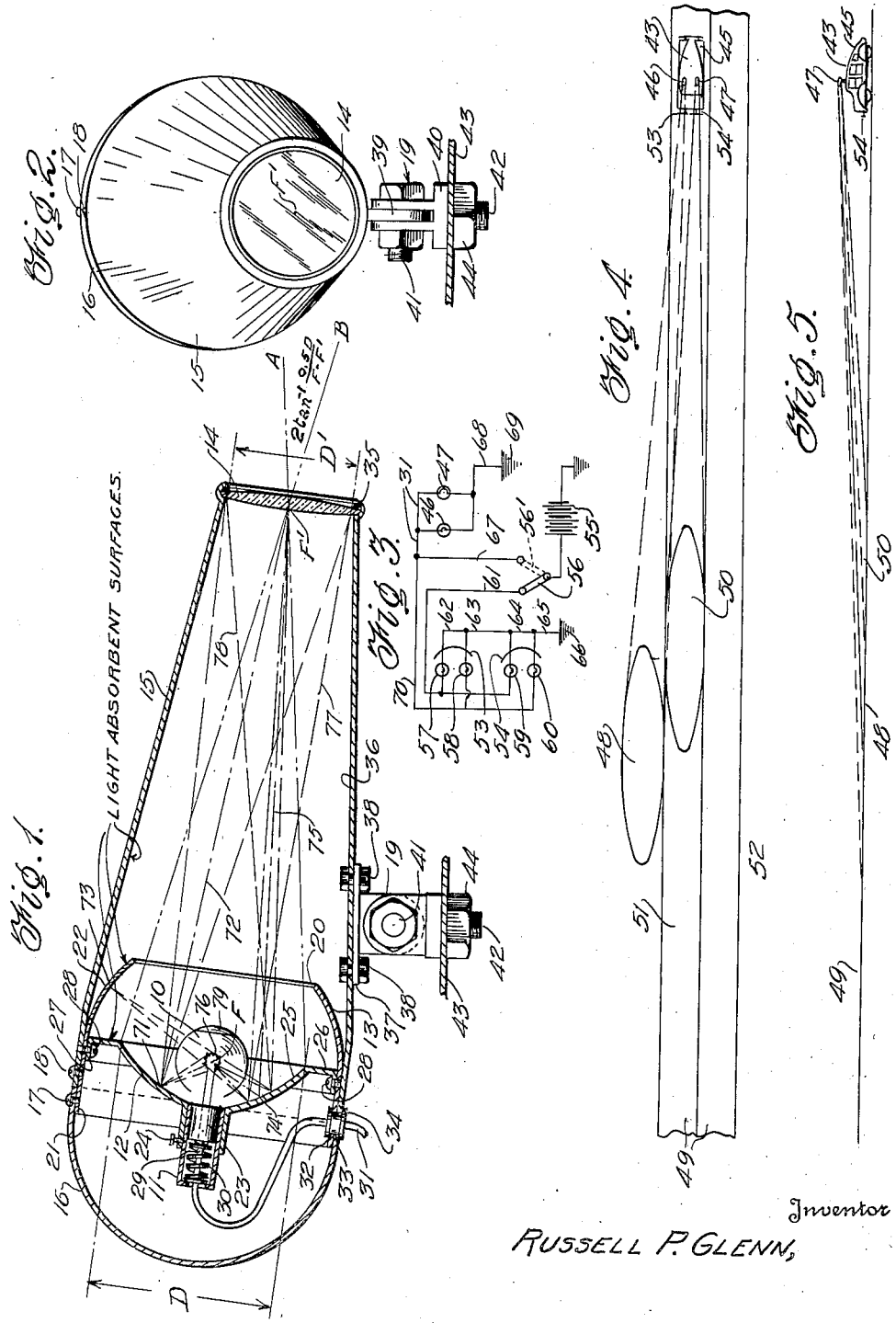
Inventor
RUSSELL P. GLENN,
By Kimmel & Crowell,
Attorneys.

Patented Apr. 18, 1939

2,154,842

UNITED STATES PATENT OFFICE 2,154,842

HEADLIGHT SYSTEM AND MEANS

Russell P. Glenn, Abilene, Tex.; J. F. Handy, executor of said Russell P. Glenn, deceased Application September 25, 1937, Serial No. 165,741

3 Claims. (Cl. 240—41.3)

This invention relates to road illuminating means for motor vehicles and more particularly to illuminating means adapted to eliminate glare.

One object of this invention is to provide a system which will provide adequate road illumination and which will eliminate glare. Another object is to provide a road illuminating system for motor vehicles arranged to illuminate the roadway in front of the vehicle and also the ground adjacent the roadway. A further object is to provide a new and improved lamp construction. Another object is to provide means making more efficient use of the available light. A further object is to provide means providing more uniform intensity of illumination and the elimination of stray light beams. Further objects and advantages of this invention may be ascertained from the following description when taken in connection with the accompanying drawing.

In the drawing Figure 1 is a longitudinal vertical cross section of a vehicle lamp including features of this invention. Figure 2 is a front elevation of the lamp in Figure 1. Figure 3 is a schematic wiring diagram of a portion of the lighting system of a motor vehicle. Figure 4 is a plan view schematically illustrating the operation of the illuminating system. Figure 5 is a side elevation similiarly showing schematically the operation of the system.

The foregoing objects and others incidental thereto have been attained by constructing a vehicle illuminating system arranged to project light beams on the surface of a highway in front of a motor vehicle and also arranged to project light beams on the ground to the right hand side of the roadway. Furthermore, the system includes selector arrangements so that the type of illumination may be quickly changed. The apparatus also includes means for projecting the light beams in such a manner as to entirely eliminate glare in the eyes of oncoming drivers.

Considering the drawing in greater detail, in Figure 1 a vertical cross section of the improved road illuminating means is shown as comprising a headlight of the adjustable type having a source of light comprising a bulb 10, mounted in an adjustable socket 11, and positioned in front of an elliptic reflector 12 and behind a reflector 13 of the form of the zone of a hollow sphere or of frusto-spherical contour, together with a lens 14. The lens 14 is arranged within the open front end of housing 15 and has its principal focus at the point F which is also the center of the portion of a sphere which forms the reflector 13. The point F is also arranged to be one of the foci of an ellipse which when revolved about the axis F—F' generates the surface of the reflector 12. The other focus F' of the ellipse, which determines the shape of the reflector 12, is located at the center of the lens 14.

The headlight includes a closed rear and an open front casing formed of an elongated tubular tapered hood or front housing 15 and a closed rear and open front rear housing 16 disposed in endwise abutting relation and secured together in a manner to be referred to. The housing 15 is secured, in a manner to be referred to, to an adjustable base 19 of pedestal form.

The reflector 13 has a front opening 20 and at its rear merges into the front end of a rearwardly extending sleeve 21. The reflector 13 is arranged within and in proximity to the rear end of housing 15. The sleeve 21 is arranged in the housings 15, 16 and bridges the joint between the abutting ends of said housings. The sleeve 21 and said housings are secured together by the holdfast means 18, 19. The outer face of the reflector 13 curves inwardly from the inner face of the housing 15 and is provided throughout with a covering 22 possessing a light absorbing characteristic.

The reflector 12 has an axial opening and a rearwardly extending sleeve 23 forming a continuation of the wall of said axial opening. The sleeve 23 provides a holder for the adjustable socket 11 which receives the plug of the bulb 10. A set screw 24 is carried by sleeve 23 for locking the socket 11 in its adjusted position. The reflector 12 is formed at its front with an outwardly annular rim 26 having its front face possessing a light absorbing characteristic. The rim 26 at its outer edge merges into a rearwardly annular flange 27. The reflector 12 is arranged in the sleeve 21. The rim 26 at its outer edge is positioned at the point of mergence of the rear end of the reflector 13 with the forward end of the sleeve 21. The flange 27 abuts the inner face of sleeve 21. The housing 15, sleeve 21 and flange 27 are connected together by the holdfast means 28.

The socket 11 contains an electrical contact 29 pressed by spring 30 against the plug of the bulb. Power is supplied by the insulated conductor 31 which passes through the openings 32 and 33 in the reflector and housing and protected by the rubber guard 34. The lens 14 is retained in the forward part of the hood by a spring retainer 35. The inner surface 36 of the hood is provided with the same light absorbent material as heretofore described in connection with the reflectors.

The base 19 includes a bracket formed of a head 37 and a stem 39. The head is secured to the housing or hood 15 by the holdfast means 38. The base 19 also includes a bifurcated bracket 40 into which extends the stem 39. The latter is capable of being adjusted at an inclination with respect to bracket 40. The stem 39 and bracket 40 are detachably connected together by the holdfast means 41. The bracket 40 includes a depending threaded stem 42 for extension through a part 43 of the vehicle. A clamping nut 44 is arranged on the lower end of stem 43.

In view of the arrangement of the lamp, the laws of reflection of light, and geometry, the operation of the lamp will be clearly appreciated. A ray of light originating at the focal point F and striking any point 71 on the reflecting elliptical surface 25 of the reflector 12 will be reflected along a path 72 through the focal point F'. A ray of light originating at the focal point F and striking the reflector 13 at any point 73 will be reflected back through the focal point F and strike the reflector 12 at a point 74 and from this point will be reflected along a path 75 through the focal point F'.

Because light from an incandescent electric lamp filament 76 does not originate from a point source but does originate from a surface spaced from and in the vicinity of a point light from the filament of the bulb 10 striking the reflector 12 at any point 71, will be reflected as a cone disposed about a focal radius 71 in F' through an angle equal to that subtended at the point 71 by the filament 76. Light from the filament 76 striking the reflector 13 at any point 73 will be reflected back to the reflector 12 about any point 74 and in return will be reflected as indicated by the dotted lines 77 and 78 toward the lens 14. Light from the filament 76 which strikes the lens 79 in the bulb 10 will be directly projected on to the lens 14.

Since the inside surfaces of the head lamps which are not used to control the direction of light rays are furnished with a dull black or other light absorbent material, the reflector light bulb and lens will appear as a glowing round spot of light. The reflected light makes this spot of substantially uniform intensity. The head lamps are so arranged and mounted on the vehicles and directed down at such an angle toward the surface of the highway that the spot of light just described will be projected by means of the lens 14 on to the highway in the form of an ellipse. The cone of light from the headlight has an angle at its apex substantially equal to the angle A F' B as indicated in Figure 1 which is about twice the angle whose tangent is 5/10 D (diameter of reflector 12) divided by the focal length of the lens 14. The lens can be made of any desired focal length. Diameter D of the reflector can be made any dimension desired between the smallest that will accommodate a light bulb and the largest that the lens 14 will project. The reflector 13 also may be made with any radius to fit the other parts of the light assembled. It is thus possible to illuminate an elliptical area of substantially any desired length and width upon a highway within three large limits.

The road illuminating means includes at least a pair of these elongated headlights mounted upon an elevated portion 43 of a vehicle 45 as at 46 and 47. These lights are respectively arranged to direct the light beams in a uniform ellipse of illumination upon oncoming portion 48 of the ground to the right of the highway 49 and upon the oncoming portion of the highway as at 50. The lights may be focused so that the beams in the area 48 either cover an area to the right of and ahead of the area 50 or behind the area 50. The highway is indicated as a double track road 49 having a right hand vehicle path 51 and a left hand vehicle path 52.

The customary pair of headlamps 53 and 54 are also provided on the vehicle. These lamps may be similar to the headlamps 46 and 47 if that is desirable. The system of lights is so arranged that the power source 55, which may be the battery on the motor vehicle, can be connected through a selector switch 56 to the system. The normal headlamps 53 and 54 preferably comprise alternate sources of illumination 57 and 58 in the headlamp 53, and 59 and 60 in the headlamp 54. The lamps 57 and 58 are preferably white lamps and the others are of a different color, preferably green lamps. The selector switch 56 when in the full line position shown, connects the source of power 55 by way of conductor 61 to the usual white lamps. The conductors, 62, 63, 64 and 65 complete the circuit to ground 66. The switch 56 may be a foot operated switch on the floor boards of the vehicle and when moved to the position 56' a circuit from the battery is completed by the conductor 67 and the wire 31 to the elongated lamps 46 and 47, on the top of the vehicle, and thence by conductors 68 to ground 69. At the same time conductor 70 connects the green lamps 58 and 60 in the circuit and by the conductors 63, 64 and 65 to ground.

It will be appreciated that a definite road surface is illuminated by directed beams of light from the normal headlamps of the vehicle and when an oncoming vehicle approaches, the selector switch may be operated to provide controlled and directed illumination upon definite portions of the highway from the lamps 46 and 47 which are arranged to eliminate the diffused or glare beams normally attendant with the operation of a motor vehicle at night. The green lamps are operated at the same time so as to provide position lights indicating the position of the motor vehicle.

The arrangement described utilizes more of the available light beams, is simple and economical to make, eliminates stray beams, and gives more uniform intensity of illumination.

Although the lights have been described as mounted preferably upon an elevated portion of the vehicle, it is to be understood that it is possible also to attain the principal objects of nonglare and ample illumination by mounting in the place of the usual headlamps in the usual position thereof, and in such event the usual headlamp wiring system is observed.

Although this invention has been described in connection with the preferred embodiment, variations coming within the true spirit and scope of the same are to be determined by the appended claims.

What I claim is:

1. In a headlight for automotive vehicles, a casing open at its front, closed at its back and formed of hollow front and rear communicating endwise abutting sections, a lens at the front end of the casing, a sleeve mounted in the forward part of the rear section, extending into the rear part of the other section and abutting the inner faces of said sections, a reflector substantially in the form of a zone of a sphere within the front section and having its rear end of largest diameter, said end merging into the front end of said sleeve, said reflector curving throughout away from the inner face of said front section, a second reflector of substantially semi-elliptical cross sectional contour arranged in the said parts and having its front formed with an upstanding circular rim of angle-shape cross section bearing against the inner face of the front part of the sleeve, said second reflector constituting a closure for the rear end of the first reflector, means for connecting said sections and sleeve together, means for connecting said front section, sleeve and second reflector together, and a light source extended forwardly from the axis of the back of the second reflector, that portion of the inner face of the casing forwardly of said sleeve, the forward face of said rim and the outer face of the first reflector respectively being provided throughout with a light absorbing surface.

2. In a headlight for automotive vehicles, a casing open at its front, closed at its back and formed of hollow front and rear communicating endwise abutting sections, a lens at the front end of the casing, a sleeve mounted in the forward part of the rear section, extending into the rear part of the other section and abutting the inner faces of said sections, a reflector substantially in the form of a zone of a sphere within the front section and having its rear end of largest diameter, said end merging into the front end of said sleeve, said reflector curving throughout away from the inner face of said front section, a second reflector of substantially semi-elliptical cross sectional contour arranged in the said parts and having its front formed with an upstanding circular rim of angle-shape cross section bearing against the inner face of the front part of the sleeve, said second reflector constituting a closure for the rear end of the first reflector, means for connecting said sections and sleeve together, means for connecting said front section, sleeve and second reflector together, a light source extended forwardly from the axis of the back of the second reflector, that portion of the inner face of the casing forwardly of said sleeve, the forward face of said rim and the outer face of the first reflector respectively being provided throughout with a light absorbing surface, and a tubular guard element for the passage of circuit connections to the light source, said element being anchored to said sections and said sleeve.

3. In a headlight for automotive vehicles, a casing open at its front, closed at its back and formed of hollow front and rear communicating endwise abutting sections, a lens at the front end of the casing, a sleeve mounted in the forward part of the rear section extending into the rear part of the other section and abutting the inner faces of said sections, a reflector substantially in the form of a zone of a sphere within the front section and having its rear end of largest diameter, said end merging into the front end of said sleeve, said reflector curving throughout away from the inner face of said front section, a second reflector of substantially semi-elliptical cross sectional contour arranged in the said parts and having its front formed with an upstanding circular rim of angle-shape cross section bearing against the inner face of the front part of the sleeve, said second reflector constituting a closure for the rear end of the first reflector, means for connecting said sections and sleeve together, means for connecting said front section, sleeve and second reflector together, and a light source extended forwardly from the axis of the back of the second reflector.

RUSSELL P. GLENN.